(12) United States Patent
Lebaschi

(10) Patent No.: US 7,505,928 B2
(45) Date of Patent: Mar. 17, 2009

(54) INTERACTIVE PRINTED PAGE OPTICAL CODE DATA ACCESS SYSTEM AND METHOD

(76) Inventor: Ali Lebaschi, 4178 Decoro St., #69, San Diego, CA (US) 92122

(*) Notice: Subject to any disclaimer, the term of this patent is extended or adjusted under 35 U.S.C. 154(b) by 515 days.

(21) Appl. No.: 10/653,784

(22) Filed: Sep. 2, 2003

(65) Prior Publication Data

US 2006/0106623 A1    May 18, 2006

(51) Int. Cl.
*G06Q 30/00* (2006.01)
(52) U.S. Cl. .............................. 705/26; 705/1; 705/14; 705/27
(58) Field of Classification Search ............... 705/1, 705/26, 27, 14; 235/456, 462, 462.1, 462.45; 715/741
See application file for complete search history.

(56) References Cited

U.S. PATENT DOCUMENTS

| | | | |
|---|---|---|---|
| 5,006,699 A | 4/1991 | Felkner et al. | 235/472 |
| 5,047,614 A | 9/1991 | Bianco | 235/385 |
| 5,396,054 A * | 3/1995 | Krichever et al. | 235/462.1 |
| 5,483,052 A | 1/1996 | Smith, III et al. | 235/472 |
| 5,640,193 A | 6/1997 | Wellner | 348/7 |
| 5,796,088 A | 8/1998 | Wall | 235/472 |
| 5,894,119 A | 4/1999 | Tognazzini | 235/375 |
| 5,913,210 A | 6/1999 | Call | 707/4 |
| 5,924,080 A | 7/1999 | Johnson | 705/26 |
| 5,933,829 A | 8/1999 | Durst et al. | 707/10 |
| 5,938,727 A | 8/1999 | Ikeda | 709/218 |
| 5,963,916 A | 10/1999 | Kaplan | 705/26 |
| 5,970,471 A | 10/1999 | Hill | 705/26 |
| 5,970,472 A | 10/1999 | Alsop et al. | 705/26 |
| 5,978,773 A | 11/1999 | Hudetz et al. | 705/23 |
| 5,992,752 A | 11/1999 | Wilz, Sr. et al. | 235/472.01 |
| 6,330,973 B1 * | 12/2001 | Bridgelall et al. | 235/462.45 |
| 6,448,979 B1 * | 9/2002 | Schena et al. | 715/741 |
| 6,991,164 B2 * | 1/2006 | Lemelson et al. | 235/456 |

* cited by examiner

*Primary Examiner*—Yogesh C Garg
(74) *Attorney, Agent, or Firm*—Donn K. Harms

(57) ABSTRACT

An interactive wide area computer network system and method for accessing and transmitting data using a printed page optical code. The code includes a system configuration mode identifier which configures the system to perform specified functions and allow the user certain interactive options. Based on the configuration mode and the user's selected option, the system generates and executes the necessary queries, commands, and responses to be routed upon the network. In an embodiment, a two dimensional optical code ("2DOC" or "barcode") is printed on a magazine page advertisement containing information such as internet web addresses, product identity, advertisement identity, location, page number, magazine issue number, and geographic routing numbers. The system extracts this information using an optical code reader and combines it with user input parameters to generate network commands which access web pages, and/or transmit and receive relevant data via a user's computer connected to the internet and running an internet browser. The user may select an option wherein the system performs unique tasks depending on the advertisement.

9 Claims, 12 Drawing Sheets

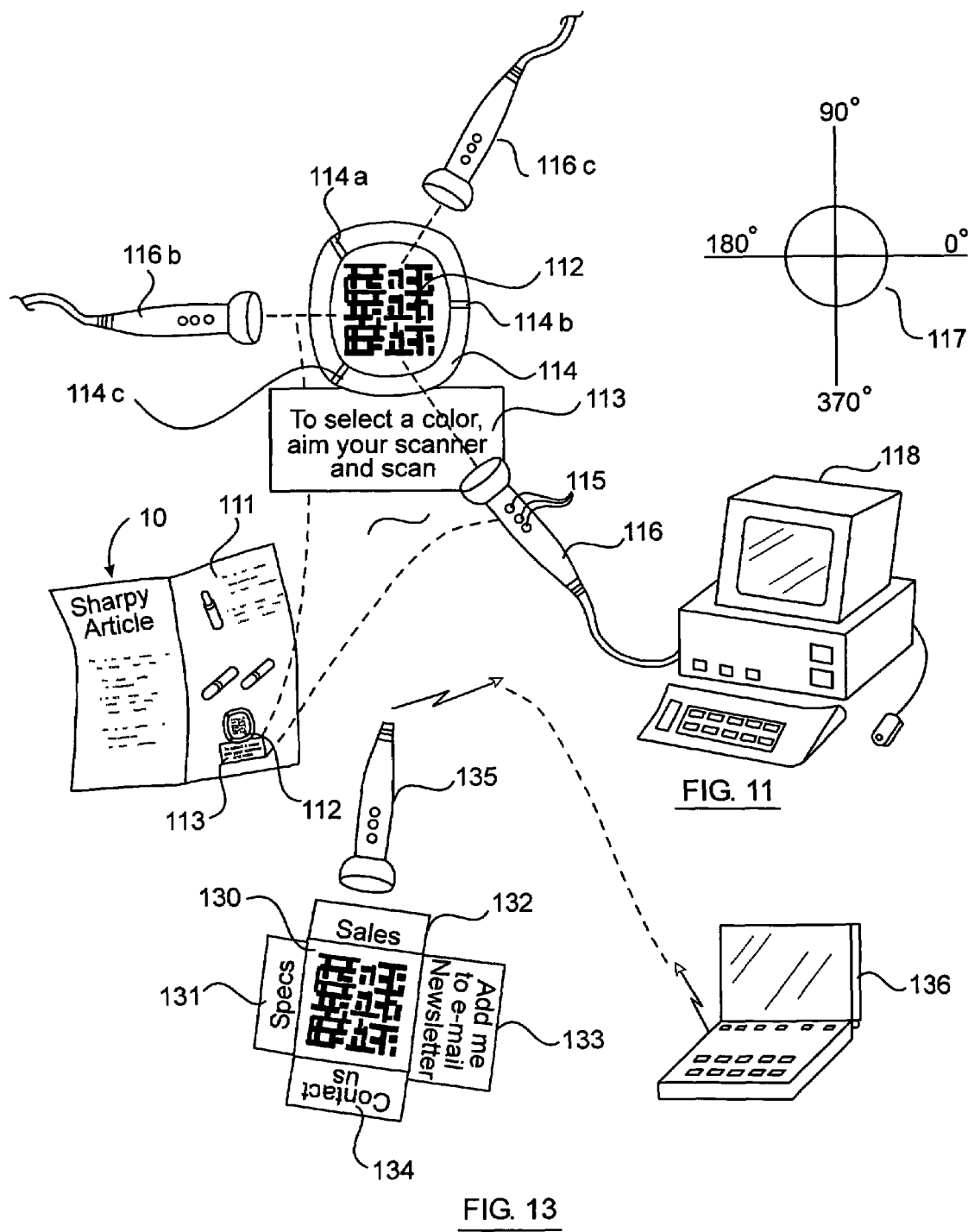

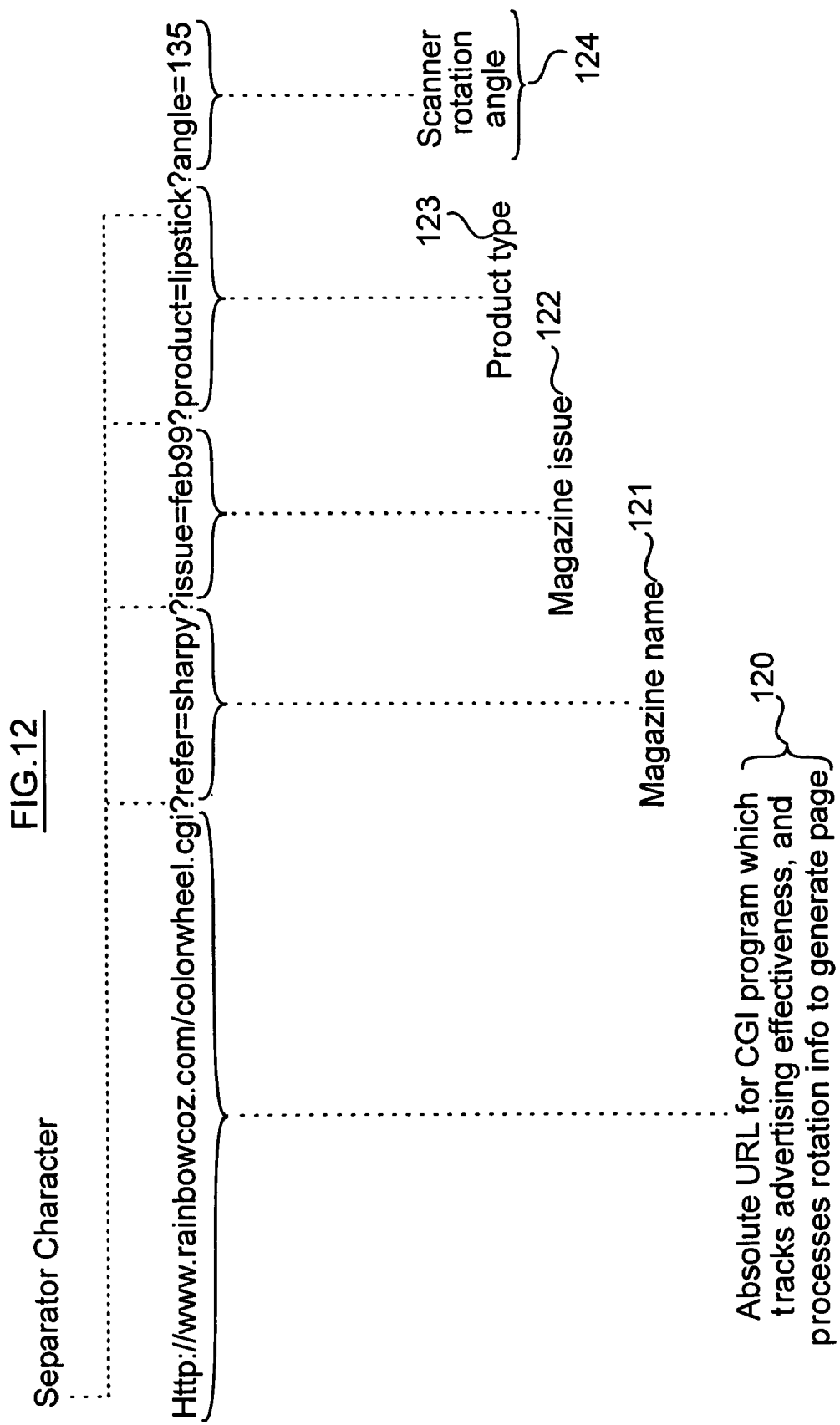

INTERACTIVE PRINTED PAGE OPTICAL CODE DATA ACCESS SYSTEM AND METHOD

PRIOR APPLICATION

The invention disclosed in the present application is the subject of U.S. Disclosure Document No. 459803 filed Jul. 28, 1999 fully incorporated herein by this reference and upon which priority is hereby claimed.

FIELD OF THE INVENTION

This invention relates to data access over wide area computer networks such as the internet and more particularly to utilizing and integrating printed page optical barcodes or similar encoded symbols with actions performed on the internet.

BACKGROUND OF THE INVENTION

It is well known that the use of wide area computer networks and particularly the internet are growing rapidly. Users nowadays have the ability to send and obtain more information than ever before relating to services provide by service providers and products created by manufacturers.

It is well known for manufacturers, distributors, vendors, retailers, the government, consumer protection groups and individuals to have websites accessible by the public for providing information relating to these products. This constant increase in information creates the need for systems which can efficiently extract useful information from all that is available.

People still read printed materials such as newspapers and magazines, and products are still delivered in printed packaging. Although many have foreseen the demise of such media, these media continue to have the advantage of permanence, lack of bulk, low cost and ease on the eyes. Often time a reader may wish to obtain more information on a particular subject as it relates to what is being read. For example, one reading a magazine may see an advertisement (or "ad") by a vendor for a particular product. Often times the ad will contain the URL (universal resource locator), otherwise known as the web address of the product manufacturer. This often will appear as a printed character string such as "HTTP://WWW.MANUFACTURER.COM" which if typed into the user's browser software such as NAVIGATOR brand browser from Netscape Corporation, will transmit to the user the content of that page. Typing such strings into the computer is time consuming and prone to error. Also, the URL will often designate only the manufacturer's main page. The user will thereafter spend time reading and sifting her way through the displayed information on the main page and other pages before finding the information of interest.

It is well known to include a barcode on printed materials containing internet web addresses as disclosed in Knowles et al., U.S. Pat. No. 5,869,819, Cragun et al., U.S. Pat. No. 5,971,277 and Ikeda, U.S. Pat. No. 5,938,727 incorporated herein by this reference. The barcode is readable by barcode readers or scanners as disclosed in Barnich, U.S. Pat. No. 4,146,782 incorporated herein by this reference. In this specification, the word "scanner" means a device which is capable of reading the code. Other systems and methods as disclosed in Perkowski U.S. Pat. Nos. 5,918,214 and 5,950,173 incorporated herein by this reference access and deliver information over the internet related to UPC (Universal Product Number) barcodes. Such transactions may be encrypted as disclosed in Durst et al., U.S. Pat. No. 5,933,829 incorporated herein by this reference.

One dimensional barcodes have a limited capacity for containing information and can detract from the appearance of the printed page as shown in FIG. 1A of Knowles et al. to the point where advertisers may feel the codes interfere with the positive effect of the ad. In addition, these codes only contain wed page addresses or URLs or product identification which is then looked up in a database to find manufacturer information.

Two dimensional printed page optical code ("2DOC") symbology regimes are well known in the art. Regimes such as The DataMatrix regime are described in Palmer, *The Barcode Book: Reading, Printing, and Specification of Bar Code Symbols*, (3rd. ED, November 1995, Helmers Pub.) fully incorporated herein by this reference. DataMatrix type codes are capable of containing data representing over 50 characters of ASCII-128 depth in a code square measuring about 0.2 inch per side for documents having about 300 dots per inch resolution. These codes also have a unique orientation which allows single image reading from any angular orientation.

To date such codes have primarily been used to track shipped items. Such codes contain information relating to the package contents, its origin, destination, relevant dates and times, as disclosed in Castro, *PERL and CGI for the World Wide Web*, (Peachpit Press, Bekeley, Calif., 1999) incorporated herein by this reference.

It is well known to store information on the internet in so called web pages, each of which is written in browser readable programming languages such as HTML (HyperText Markup Language) as described in Castro *HTML 4 For the World Wide Web*, (Peachpit Press, Berkeley, Calif., 1998) incorporated herein by this reference. It is further well known that additional data may be passed to such sites or extracted from such sites using more advanced features available in existing internet based programming languages such as PERL, CGI or JAVASCRIPT, as disclosed in Castro, *PERL and CGI* . . . supra. For example, one may pass information through use of so-called Environmental Variables, or by adding information to the url string using the CGI "GET" method, or by using the CGI "POST" method. The data access abilities of such languages is well known to those skilled in the art.

It is well known to transmit internet advertising effectiveness information to various network components such as websites Castro, *PERL and CGI* . . . supra. For example, when a user clicks on an advertising banner on a particular website, the user is not only taken to the website of the advertiser, but also, other information regarding the effectiveness of the ad can be transmitted. If the ad was supplied by an ad service provider such as doubleclick.com, the transaction would likely be reported to the ad service. In addition, information identifying the publisher would likely be sent to the service and to the advertiser. Indeed, information regarding the referring page is typically stored in the HTTP-REFERRER environmental variable which would be accessible to the advertiser. However, such effectiveness tracking was heretofore unavailable to links originating from a printed page. In addition, this variable is subject to inaccuracies in various situations such as when a user types in a new URL while viewing a particular page (Castro, *PERL and CGI* . . . , supra page 63).

Accordingly, there is a need for taking advantage of the greater informational storage capacity and omnidirectional scanning or reading capability of 2DOC and allowing user interactivity to more precisely access and send data on the internet.

SUMMARY OF THE INVENTION

The principal and secondary objects of this invention are to provide a system and method for allowing users to efficiently and interactively access and send information on a wide area computer network based on the user's reading of printed matter such as a magazine.

It is a further object of the invention to provide a system and method which allows a wide degree of flexibility and configurability for different types of printed matter containing and relating to different types of information.

It is a further object of the invention to provide a system greater informational interaction capability between the numerous interested parties in internet based transactions, such as through providing advertising effectiveness tracking to publishers and advertisers.

It is a further object of the invention to provide a system which is easily upgraded as computer networks evolve.

It is a further object of the invention to provide a system which takes advantage of the ability of current symbology scanners to omnidirectionally capture a printed code allowing enhanced user interactivity and access efficiency.

These and other valuable objects are achieved by a system and method for practicing the same which embeds system configuration information within the code. Upon capturing the code, the system is configured according to the configuration information into one of a plurality of configuration modes. Each mode allows for predetermined system functionality and provides for the input of various user selectable parameters. System functionality includes generation of network commands usable by any of a number of network components such as internet websites for accessing and acting upon data. Some configuration modes take advantage of scanner orientation as added user input.

BRIEF DESCRIPTION OF THE DRAWING

FIG. 11 is a block diagram of the components of the system of the invention as detailed in Example 3.

FIG. 12 is a an illustration of a character string representing the hypertext transfer protocol command generated by the driver as detailed in Example 3.

FIG. 13 is a block diagram of the components of the system of the invention as detailed in Example 4.

DESCRIPTION OF THE PREFERRED EMBODIMENT OF THE INVENTION

In this specification, the term "printed page" shall mean any tangible media for carrying human readable symbols such as text. Such media can include paper based media such as magazines, books, cardboard product packaging and plastic media.

Figure 1:
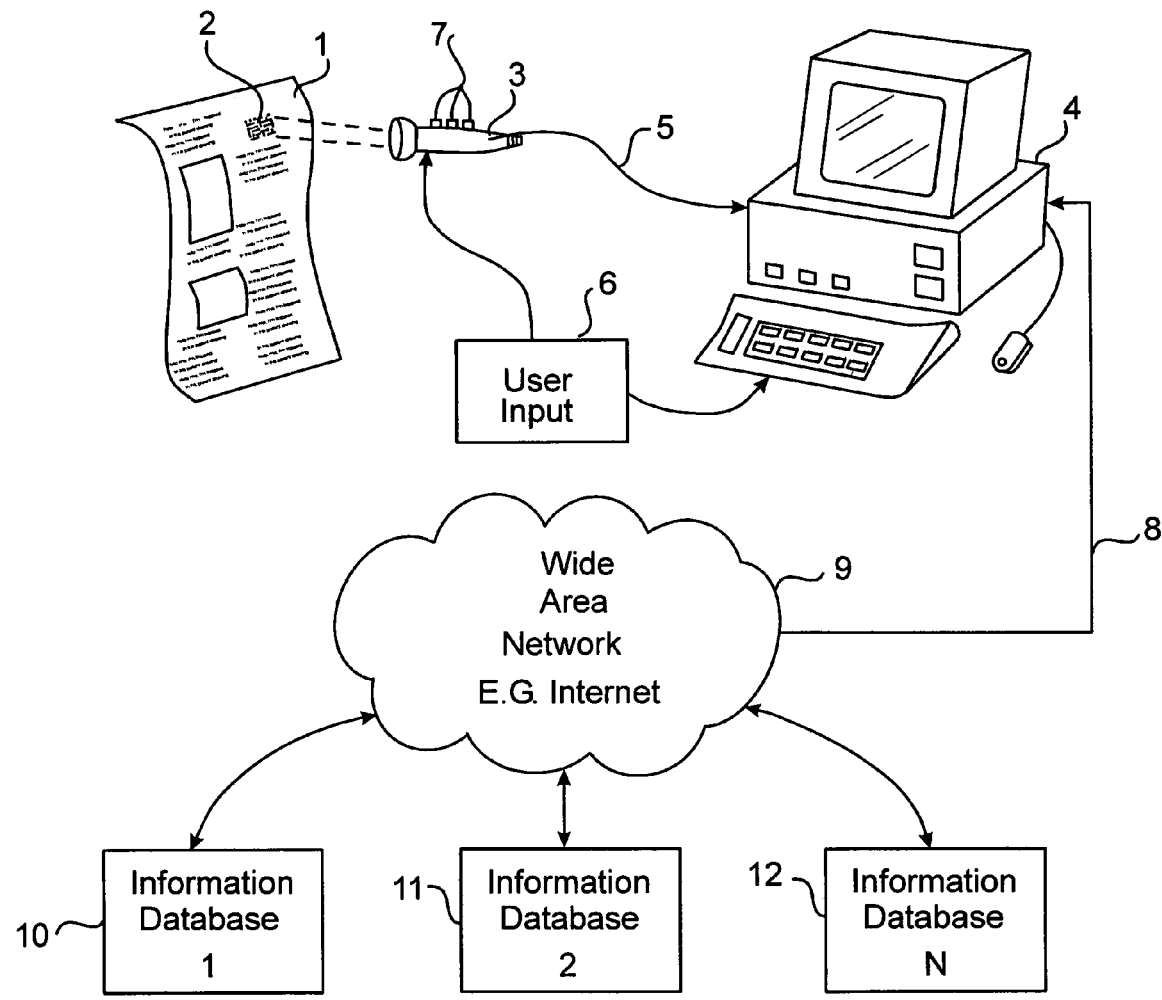
FIG. 1 is a block diagram of the components of the system of the invention.

Referring now to the drawing, there is shown in FIG. 1 a printed page such as an magazine advertisement 1 comprising at least one two-dimensional optical code ("2DOC") 2 which comprises coded information having relational pertinence to the content of the printed page. An optical scanner 3 reads the 2DOC and decodes it into a data stream fed to the user's computer 4 via a data link 5 such as through a wire, an infra-red or radio link, or other linking means well known in the art. User input parameters including option selections 6 are entered into the scanner, using buttons or keys 7 or into the computer or both and interpreted. Based on the information in the 2DOC and the user parameters, software running on the computer generates one or more commands which are sent on a data link 8 via a wide area network 9 such as the internet to a number of information databases 10,11,12 also connected to the network. The commands send data from the user computer, access data within the databases and cause computers running the databases to send data back to the user's computer.

Figure 2:
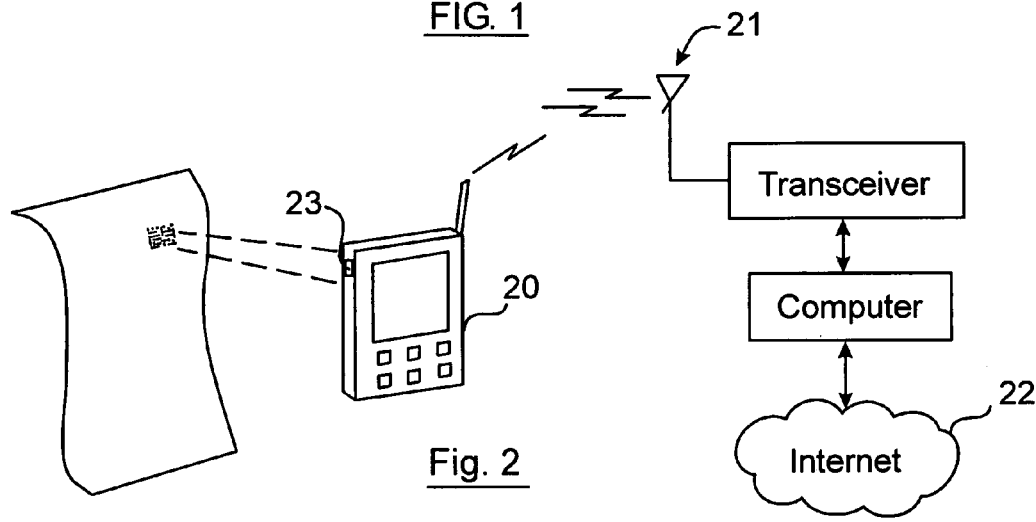
FIG. 2 is a block diagram of a second embodiment of the components of the system of the invention as integrated with a wireless hand-held computer.

Referring now to FIG. 2, with the evolution of portable, handheld computers 20 having wireless connection 21 to the internet 22, the above system may be adapted to integrate the scanner 23 with a portable computer.

The information encoded in the 2DOC includes a designation for one of a number of system configuration modes. Each configuration mode provides a number of predetermined functionalities and various user selectable options. Depending on the configuration mode, the user can interactively decide, prior to scanning or capturing the code, what portion of the scanned information will be used and what additional information, if any, will be sent to other informational databases. Further, the mode and user input parameters will determine whether scanner rotation information is used.

Those of ordinary skill in the art of device driver programming, data management, and network software programming will readily be able to program the appropriate devices to accomplish the functions described above and below.

The invention is further understood by way of the following examples:

EXAMPLE 1

Figure 3:
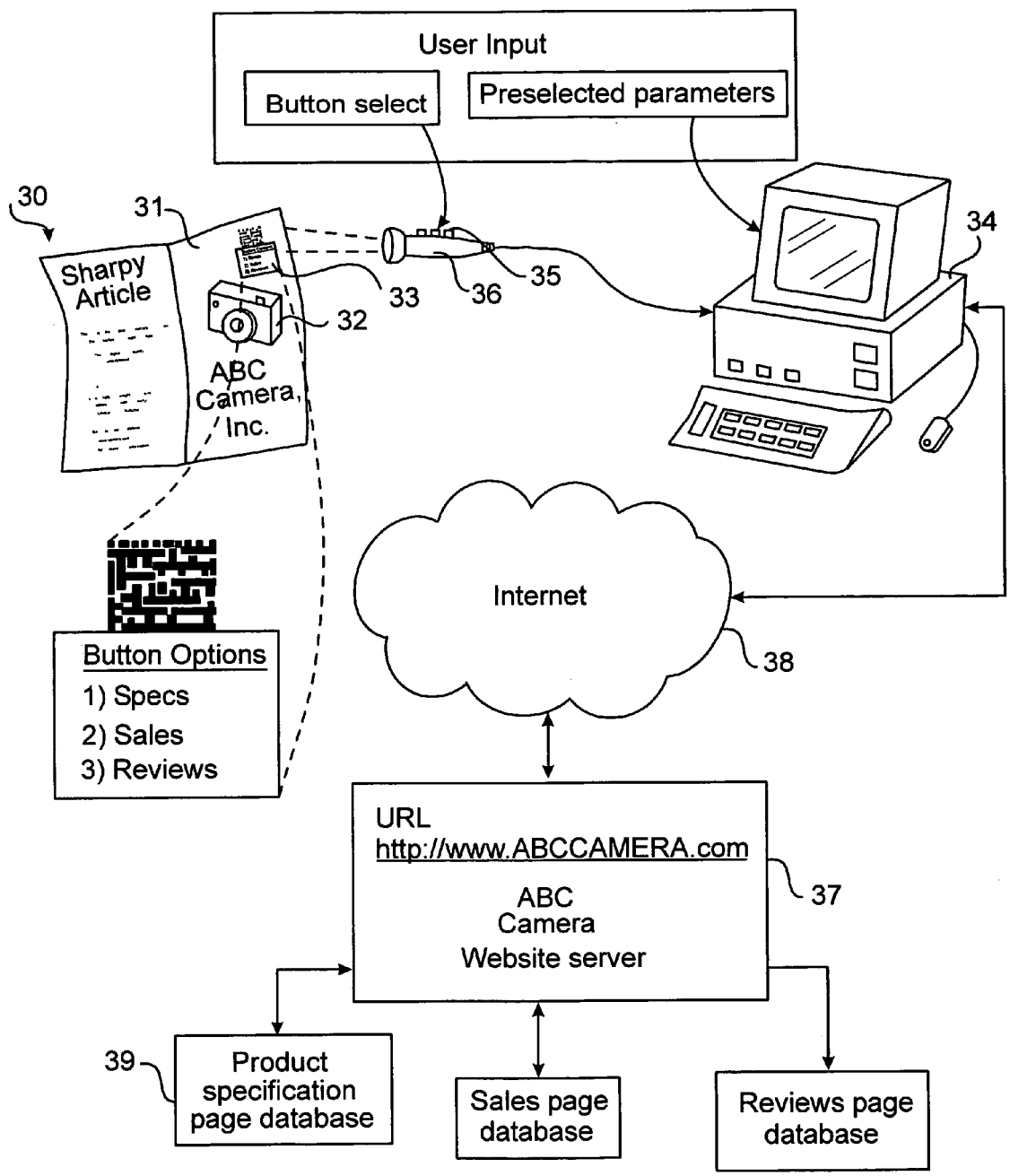
FIG. 3 is a block diagram of the components of the system of the invention as detailed in Example 1.

Referring now to FIG. 3, a user obtains a copy of Sharpy magazine 30 having an advertisement page 31 by ABC Camera Company for a particular camera model depicted by photograph 32. A 2-dimensional optical code (2DOC) 33 contains a plurality of encoded information units including the URL for the ABC Camera Company website "http://www.abccamera.com", and the relative URLs for the particular camera model "/products/MN02356", and the relative URLs for various information and services for the camera such as the camera model specs, "/specs.html"; the sales page, "/sales.html"; the product review page, "/review.html"; as well as information regarding the magazine advertisement such as:

the magazine identity "sharpy", the magazine issue number "jan1999", the geographic magazine routing number "12345-678", as well as advertisement identity within the magazine "abc1", advertisement location "fullpage", and page number "p21".

The 2DOC also comprises an information unit regarding the system configuration mode to be used with respect to this 2DOC. In this case, the configuration mode allows the user the option of selecting a direct link to one from a number of the available ABC Camera Company webpages.

A legend 33a is located proximally to the 2DOC 33 and instructs the user as to the available linking options which in this case are: 1) product specs, 2) product sales, and 3) product reviews. The user selects an option by depressing one of three buttons 35 on the handheld scanner 36. Alternately, the system allows the user to preselect certain parameters or options on the software in the computer.

The user decides she would like information on the camera's size and weight. According to the legend instructions, the user aims the scanner at the code and depresses the button corresponding to option #1, the product "Specs" which initiates a scanner read operation.

Figure 4:
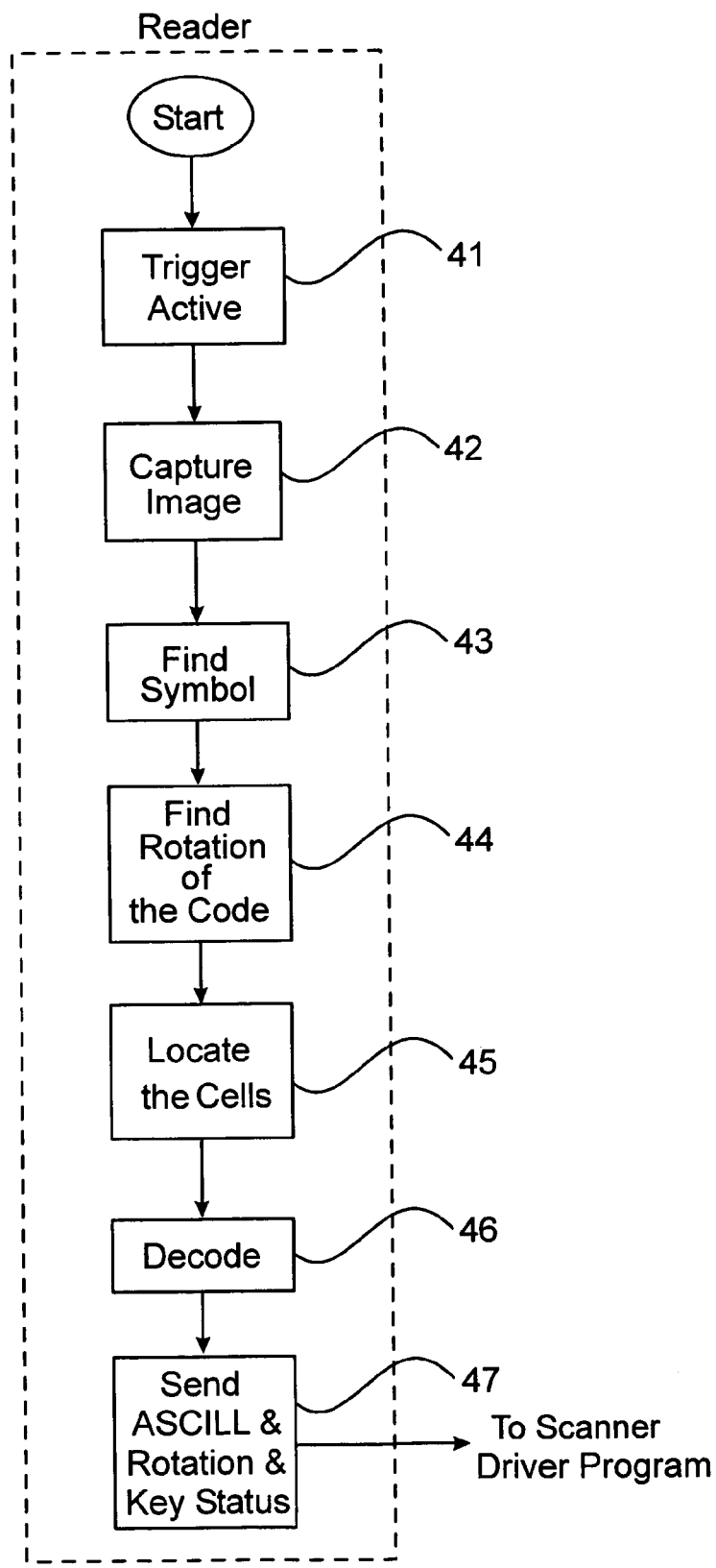
FIG. 4 is a diagrammatic flow chart of a read operation.

Referring now to FIG. 4, there is shown a flow diagram of the "Read" operation conducted by the scanner. A read is initiated by the sensing of the "trigger active" state 41 caused by the user depressing one of the option select buttons. The camera captures an image of the code 42. Image processing algorithms well known in the art and running in firmware aboard the scanner find 43 the 2DOC in the image and calculate the relative rotation 44 of the scanner with respect to the code. The cells within the code are located 45 and the entire code is decoded 46 to form an data stream containing ASCII string information taken from the code, rotation information, and option select button identification key status 47, which is passed to the scanner driver program running on the user's computer 24.

Figure 5:
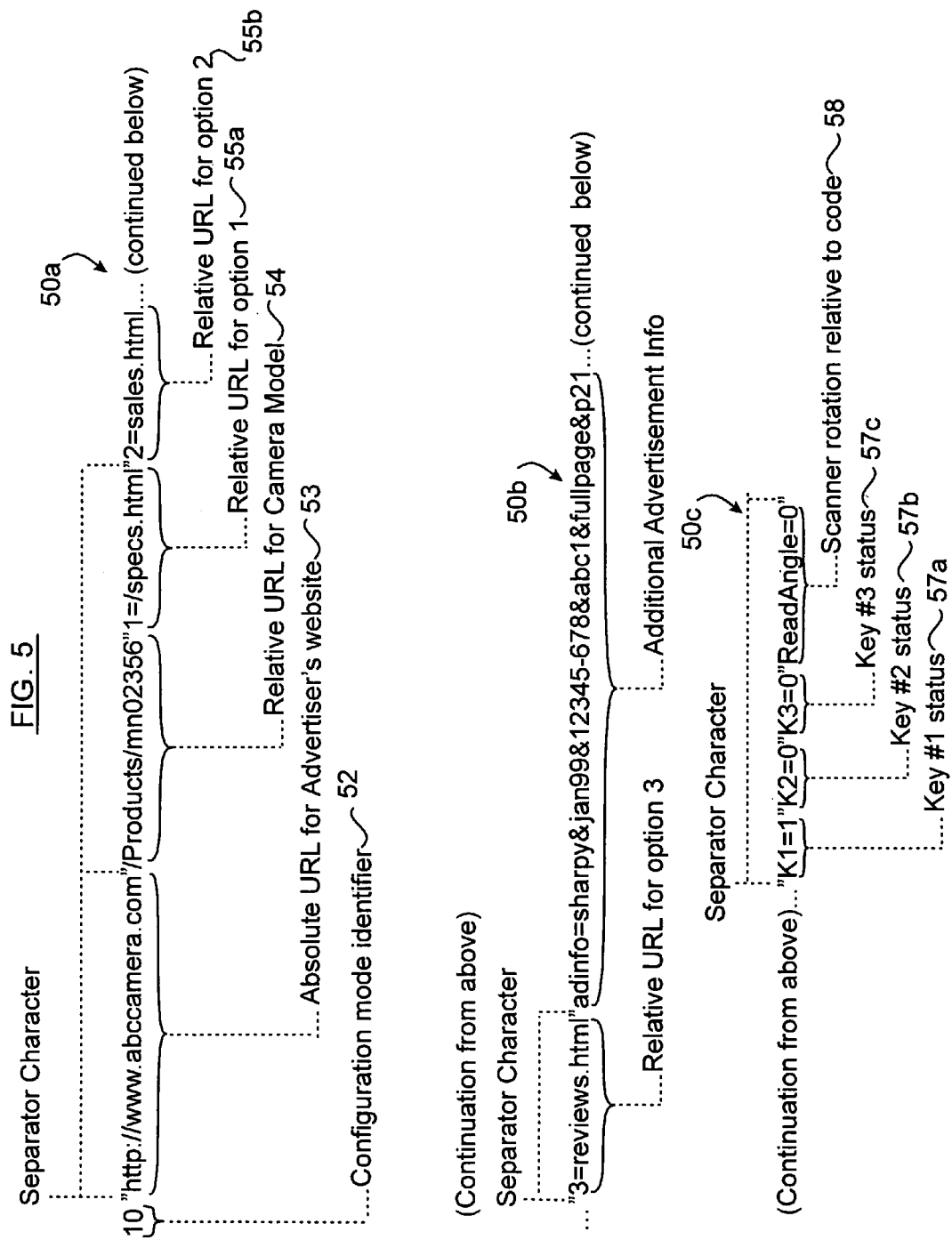
FIG. 5 is a an illustration of a character string representing the data stream from the scanner after a read operation as detailed in Example 1.

Referring now to FIG. 5, the data stream comprises the informational units integrated into a character string 50a,50b, 50c. Each unit is separated by a discriminating separator character 51 in the form of a double quotation mark. The string includes a "configuration mode" identifier 52, the absolute URL for the advertiser 53, the relative URL for the product 54 and for each of the pages matched to the user selectable options 55a,55b,55c, an advertisement information string 56, the user option key depressed statuses 57a,57b, 57c, and finally, the scanner rotation angle 58.

It is important to note that in this example, it is unnecessary for the advertisement information string 56 and the rotation angle 58 to be included in the data stream.

Figure 6:
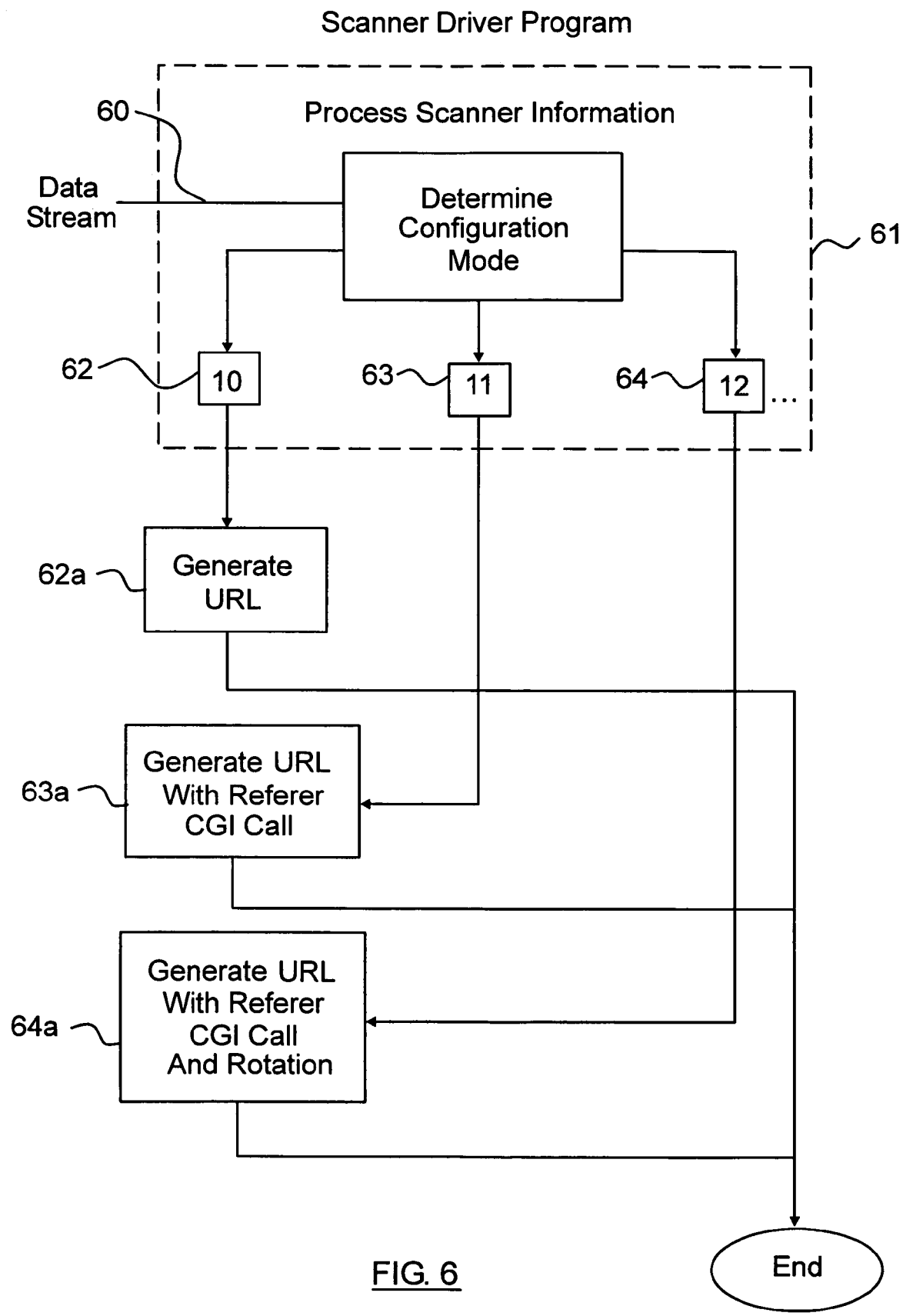
FIG. 6 is a diagrammatic flow chart showing the scanner driver procedure configuring the system according to the scanned mode identifier for Examples 1-3.

In FIG. 6, the scanner driver program running on the user's computer accepts the data stream 60 and processes it 61 to determine the particular configuration mode for this scan. The system can be programmed to recognize a number of different modes each identified by its own unique identifier. In this case, the scanned mode identifier is "10" 62 which corresponds to a mode which simply generates the URL 62a for carrying the user to the webpage denoted by the selected option. The other modes 63,64 will be described in subsequent examples.

After identifying the scanned mode, the driver processes the data stream from the scanner interpreting the configuration mode identifier and configuring the system accordingly. The driver then extract the information units and generate commands according to the mode. In this case, this means the scanner key status will be tested to see which button was depressed. Since the Key #1 status 57a indicates button #1 was depressed, the driver generates the absolute URL for the product specification page, namely: http://www.abccamera-.com/products/MN02356/specs.html The user's computer 34 is running NAVIGATOR brand internet browser available from Netscape, Inc. of Mountain View, Calif. The browser has a software plug-in that allows interaction with the scanner and its driver.

The URL is forwarded to the browser a command is initiated to access the associated website of abccamera 37 through the internet 38 and download the product specification page 39 to the user.

It should be noted that the embedded mode may configure the system supply certain standard strings in generating the URL. For example, in a particular mode, the absolute URL for the advertiser's website as encoded in the 2DOC could be the string "abccamera". In this mode the driver would automatically supply the "http://www." prefix and ".com" suffix while generating the URL.

EXAMPLE 2

Referring back to FIG. 6, the 11 configuration mode 63 performs the operation of the 10 mode 62 and in addition, accesses a webpage set up by the advertiser (ABC Camera Company) for tracking the effectiveness of their Sharpy magazine ad campaign.

Figure 7:
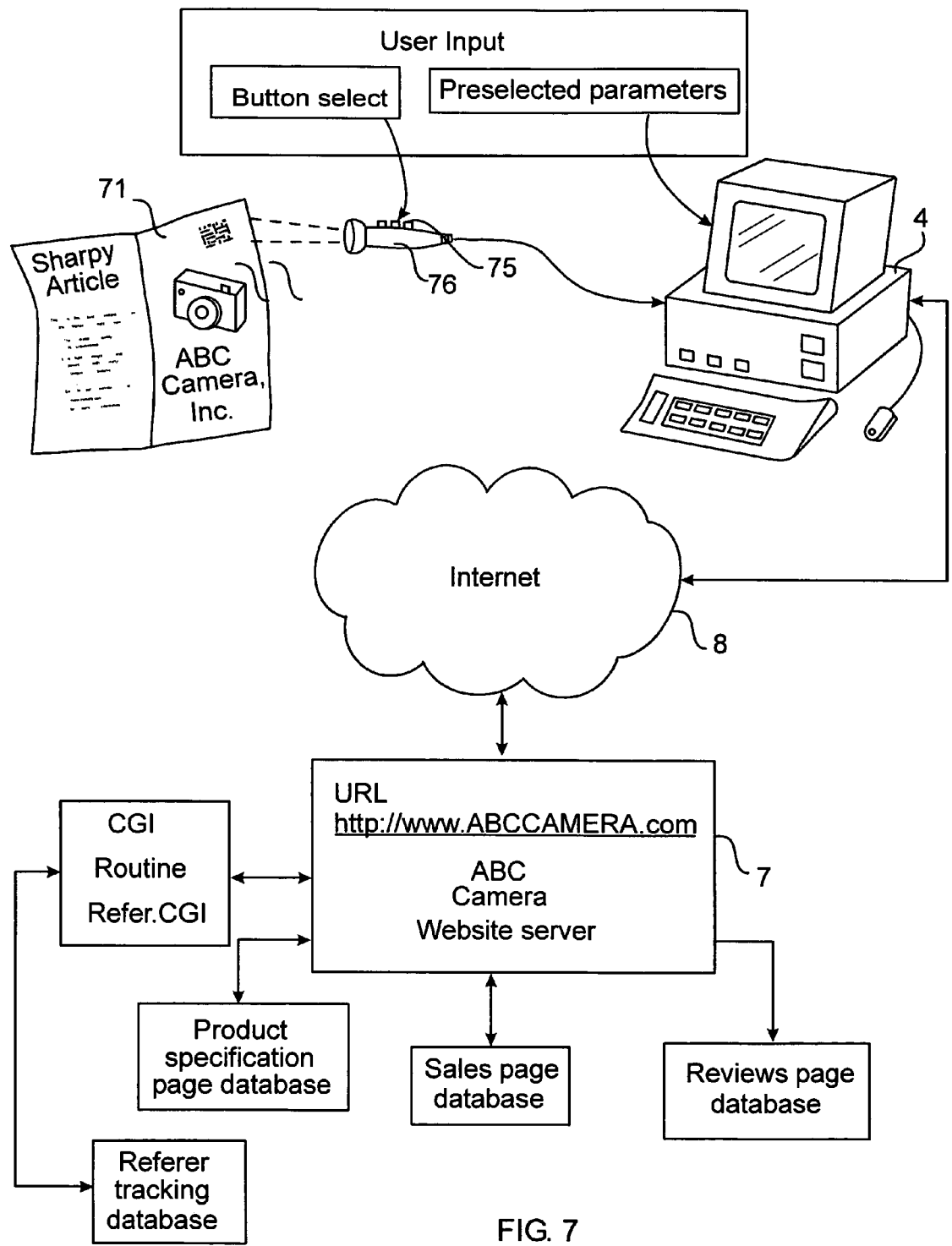
FIG. 7 is a block diagram of the components of the system of the invention as detailed in Example 2.

Referring now to FIG. 7, as in the previous example, the user again picks up a copy of Sharpy Magazine 70 and desires more information regarding the MN02356 model camera displayed in the ABC Camera Company ad 71. In this example the user wants to read the reviews about the camera and therefore depresses button #3 75 on her scanner 76 as instructed by the legend 73a to scan the associated 2DOC 73.

Figure 8:
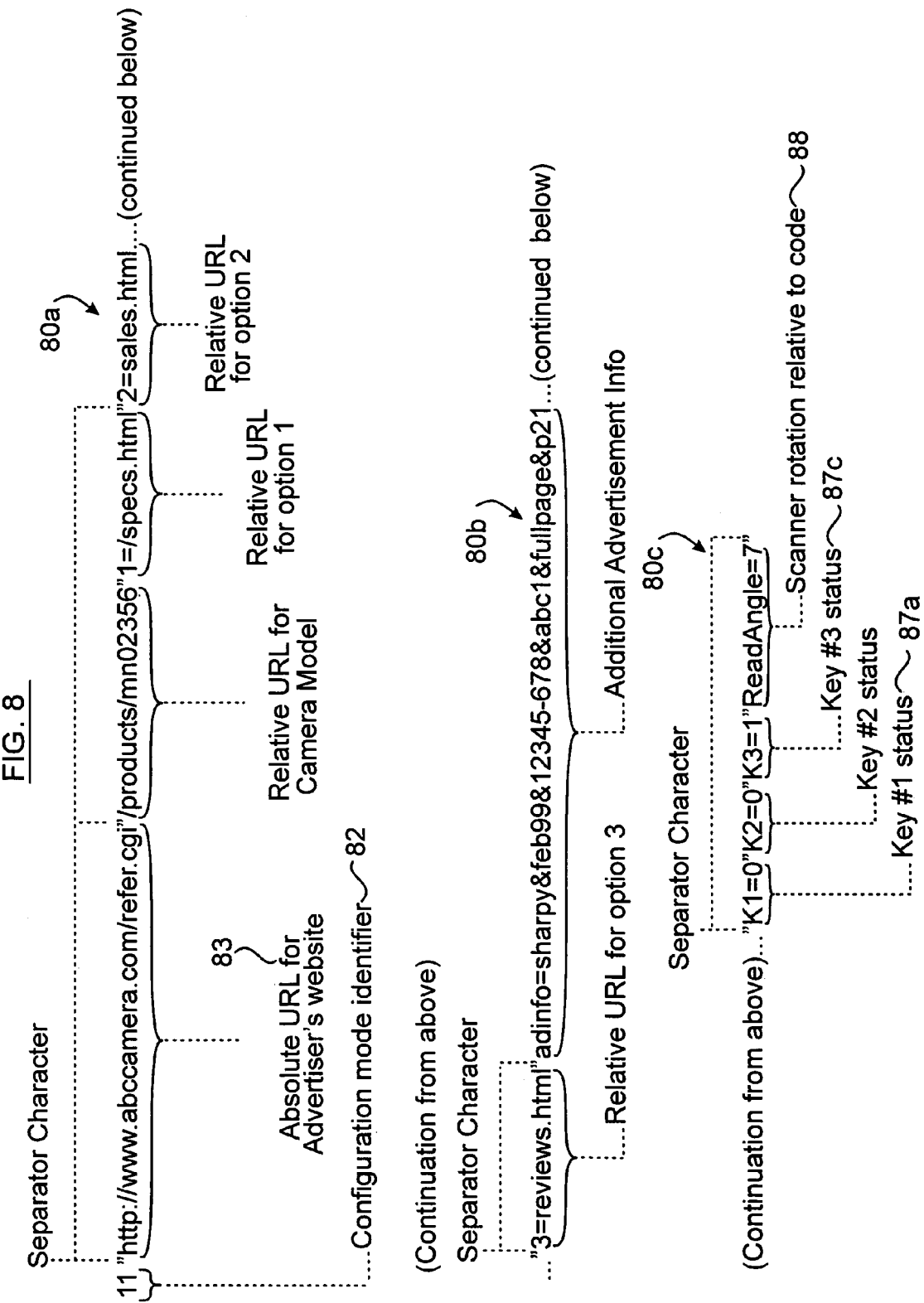
FIG. 8 is a an illustration of a character string representing the data stream from the scanner after a read operation as detailed in Example 2.

Referring now to FIG. 8, the data stream comprises the informational units integrated into a character string 80a,80b, 80c. The differences from the previous example are that: the configuration mode identifier 82 is now "11"; the absolute URL for the advertiser 83 is now "http://www.abccamera-.com/refer.cgi"; the advertisement information string 86 is now "adinfo=sharpy&feb99&12345-678&abc1&fullpage&p21"; the user option key depressed statuses 87a,87c are now "K1=0 and "K3=1"; and finally, the scanner rotation angle 88 is now arbitrarily different as "ReadAngle=7".

The scanner driver then determines that the scanned 2DOC uses configuration mode 11 63 and so configures the system. The driver then extracts the information units and generate commands according to the mode.

Under this mode, the accessed URL runs a CGI program which processes the advertising tracking information and then carries the user to the desired webpage. Therefore, the scanner key status will be tested to see which button was depressed. Since the Key #3 status 87c indicates button #3 was depressed, the driver must generate a command or commands which carry this information.

Figure 9:
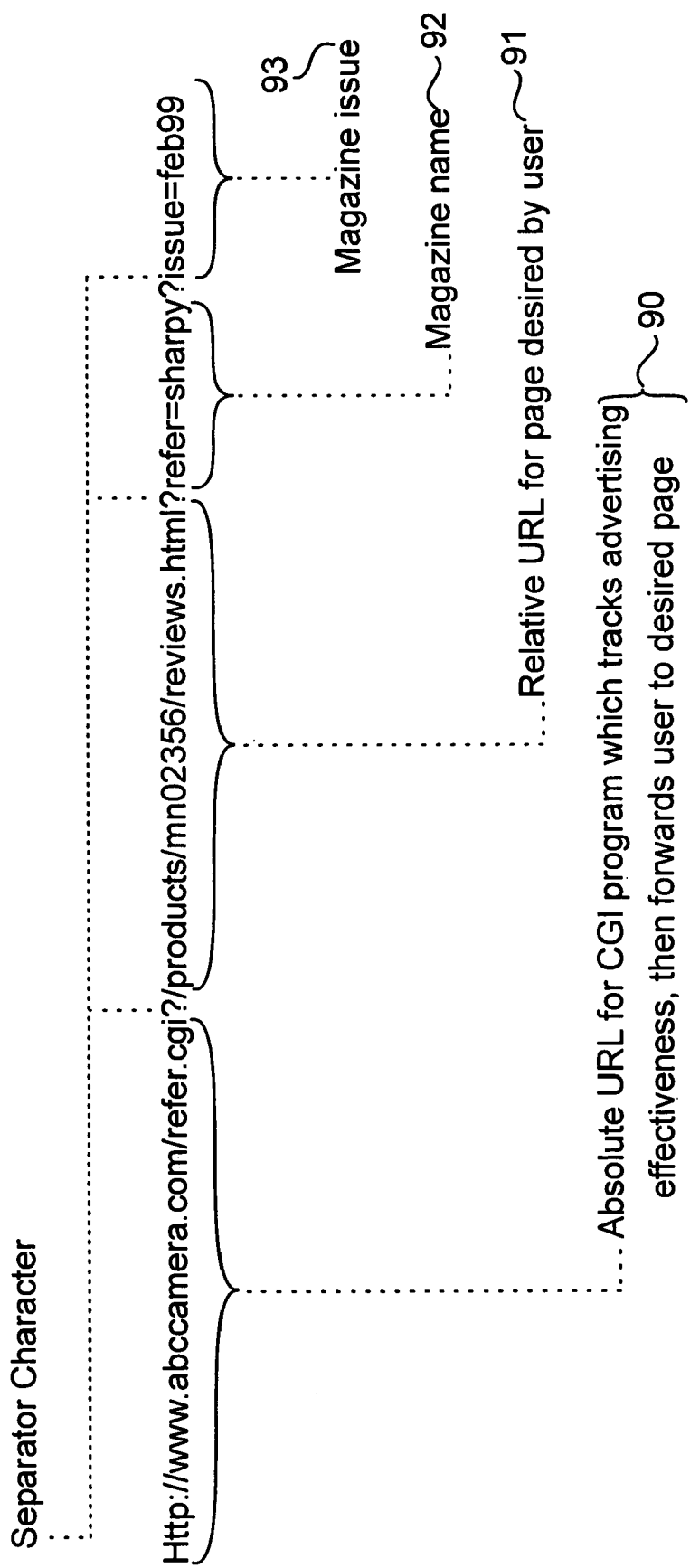
FIG. 9 is a an illustration of a character string representing the hypertext transfer protocol command generated by the driver as detailed in Example 2.

Therefore as shown in FIG. 9, the driver generates the URL for the advertising tracking page 90 and concatenates the additional information string needed by the CGI program running at that page. The additional information string therefore includes the page desired by the user 91 and the magazine name 92 and the magazine issue 93.

Figure 10:
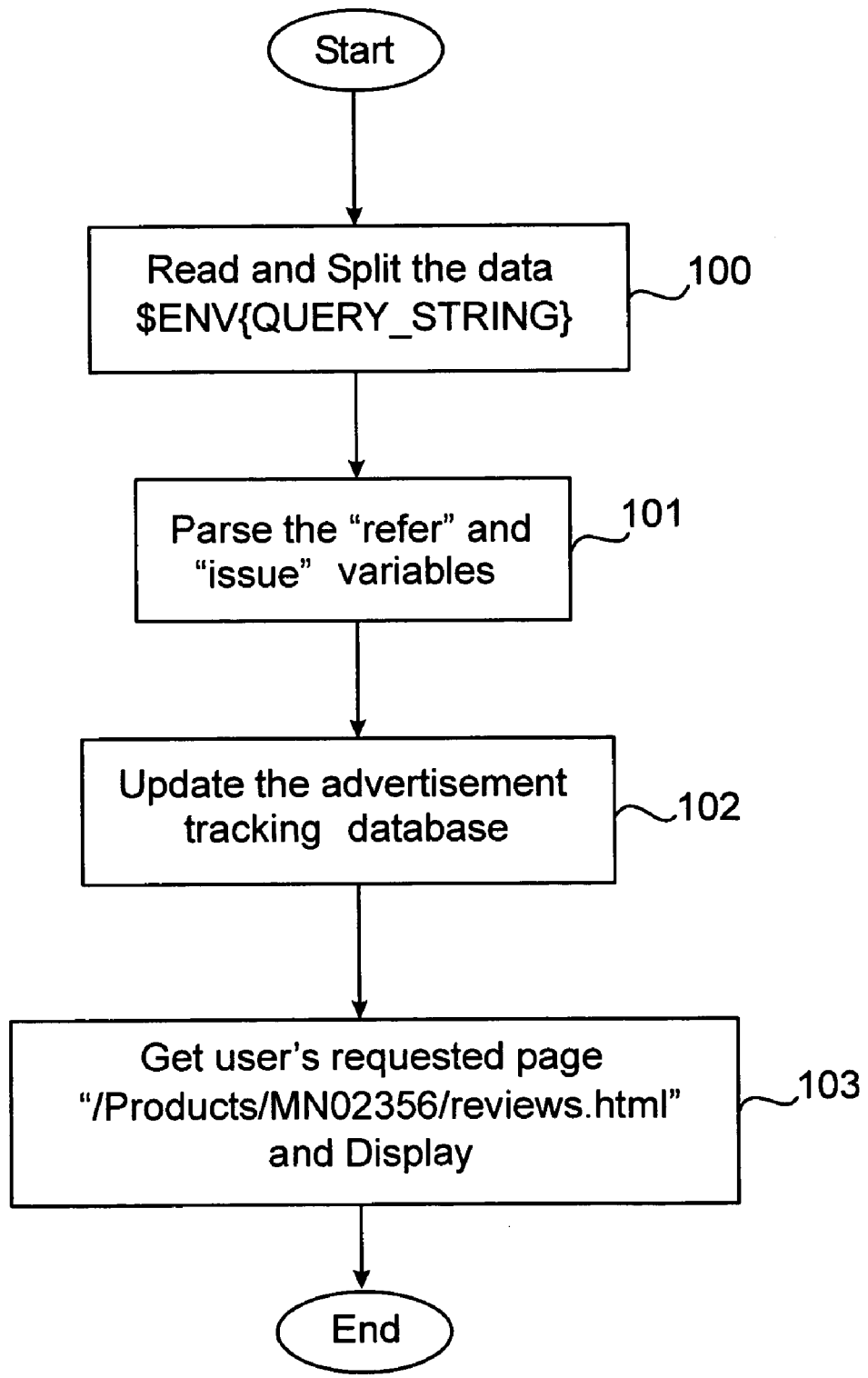
FIG. 10 is a diagrammatic flow chart of the functions of the advertiser's website CGI program as detailed in Example 2.

Referring now to FIG. 10, the CGI program would read and split the data string 100, parse out the variables of interest 101, update the database 102 and then take the user to her desired page 103. Those skilled in the programming arts can easily derive the code necessary to perform the above tasks.

It should be noted that other information demographically identifying the user can similarly be sent to the advertisers database, or even to a database set up at website kept by Sharpy Magazine. In that case, the scanner driver can be adapted to generate or look up the URL for the Sharpy magazine website "http://www.sharpymagazine.com" according to the magazine identification in the adinfo string 86. Alternately, the URL for the magazine could be included as an informational unit in the 2DOC.

In this case it should be noted that one of the user input preselected parameters may be a privacy selection. Therefore, after configuring the system according to the scanned mode, the driver would test the privacy flag. If set, the driver would not access or update the advertisement effectiveness tracking database with private information.

It should be noted that a mode may be added to the list of available modes which prevents user privacy. Those skilled in the art will readily recognize the ability of the invention to allow such unlimited configurability.

EXAMPLE 3

Referring back to FIG. 6, the 12 configuration mode 64 performs the operations of mode 11 63 and in addition, utilizes the rotation angle information to provide even greater efficiency to the user.

Referring now to FIG. 11, the user again picks up a copy of Sharpy Magazine 110 and has found an ad 111 by Rainbow brand cosmetics company in Sharpy magazine. The ad has a printed 2DOC 112, an associated legend 113, and a surrounding ring 114 or colorwheel which has a spectrum of colors printed on it. One location 114a has the color magenta, another location 114b has the color brown, and another 114c has the color purple. Other colors also exist on the ring. The ad directs the user to scan the image while pointing the scanner at the color of interest while depressing any of the three buttons 115 on the scanner 116.

The user decides she would like information on the magenta colored lipstick. The legend 113 for the code instructs the user how to go about selecting a color by orienting the scanner 116 at the 2DOC 112 in alignment with the color of interest 114a, and depressing a button. Selecting brown 114b or purple 114c would require the appropriate scanner orientations 116b and 116c respectively. Angles are measured according to one of a number of well-known regimes 117.

As with the previous examples, the button initiates a read operation wherein the scanner captures and decodes the code into a number of informational units and transmits them along with configuration mode identifier, rotation information and button key selected as a data stream to the user's computer 118.

The driver then generates the appropriate command or commands to be sent to the user's browser to activate a connection to the advertiser's URL and pass along the referring ad data and rotation data used by the CGI program running at the URL.

Therefore as shown in FIG. 12, the driver generates the URL for the colorwheel processing page 120 and concatenates the additional data strings representing the variables needed by the CGI program running at that page. They include the magazine name 121, the magazine issue 122, the type of product 123, and the rotation angle 124.

As with the previous example, the CGI program reads and splits the data strings, and parses out the variables of interest. In this example, there would be code to update the advertising effectiveness database then generate or look up the appropriate pages or images having the color corresponding to the user's choice and display.

Since Rainbow Cosmetics may have a number products such as nail polish or eye shadow which are capable of being displayed in different colors, the program tests the "product" variable. In this case, the "product" variable being "lipstick" causes the program to select the "lipstick" page template. The "angle" variable is then tested against a table which determines the color to be displayed. In this case, the angle of 135 degrees corresponds to the color magenta.

In this way, the user efficiently bypasses the time consuming process of selecting color after accessing the lipstick website.

In this example, the user input parameter consisted of orienting the scanner to generate the proper angle value. However, in an alternate embodiment, the buttons on the scanner 115 could each correspond to a different product. The code legend 113 would instruct the user for example to select button #1 for lipstick, button #2 for nail polish, and button #3 for eye shadow.

It is important to note in this example that all of the information necessary for running the CGI program at the advertiser's site is contained in the command string as would be formed using the CGI GET method. Those skilled in the art will recognize the other forms of transmitting the necessary information may be used.

It is important to note that the driver has selected a subset of the informational units contained in the optical code to be sent to the driver according to the configuration mode and potentially the user selected options.

EXAMPLE 4

Referring to FIG. 13, in this example the configuration mode allows for the use of rotation information dependent upon a user's selection of four rotation options based on a legend in the form of guide words 131,132,133,134 positioned along the periphery of a rectangular 2DOC 130. By aiming the scanner 135 and executing a read operation in the 90 degree orientation, the user selects the "contact us" option. This causes the driver to generate commands necessary to initiate operation of the email program on the user's system 136. The scanner may communicate wirelessly 137 with the user's computer 136 using well known wireless communication devices and methods as disclosed in *Bluetooth Specification Version* 1.0A, 24 Jul. 1999 currently available from www.bluetooth.com The above system allows greater interaction between advertiser and user through printed media and creates a more efficient environment for information transfer.

The system will also allow for a greater degree of dynamic interaction between the advertiser and publisher. For example, the advertiser may set aside room on its webpages to be dynamically filled with an advertisement chosen by the publisher based on the users history or preferences, or based on whatever other criteria the advertiser or publisher desires. Such dynamic allocation of ads is well known to those skilled in the art.

Figure 14:
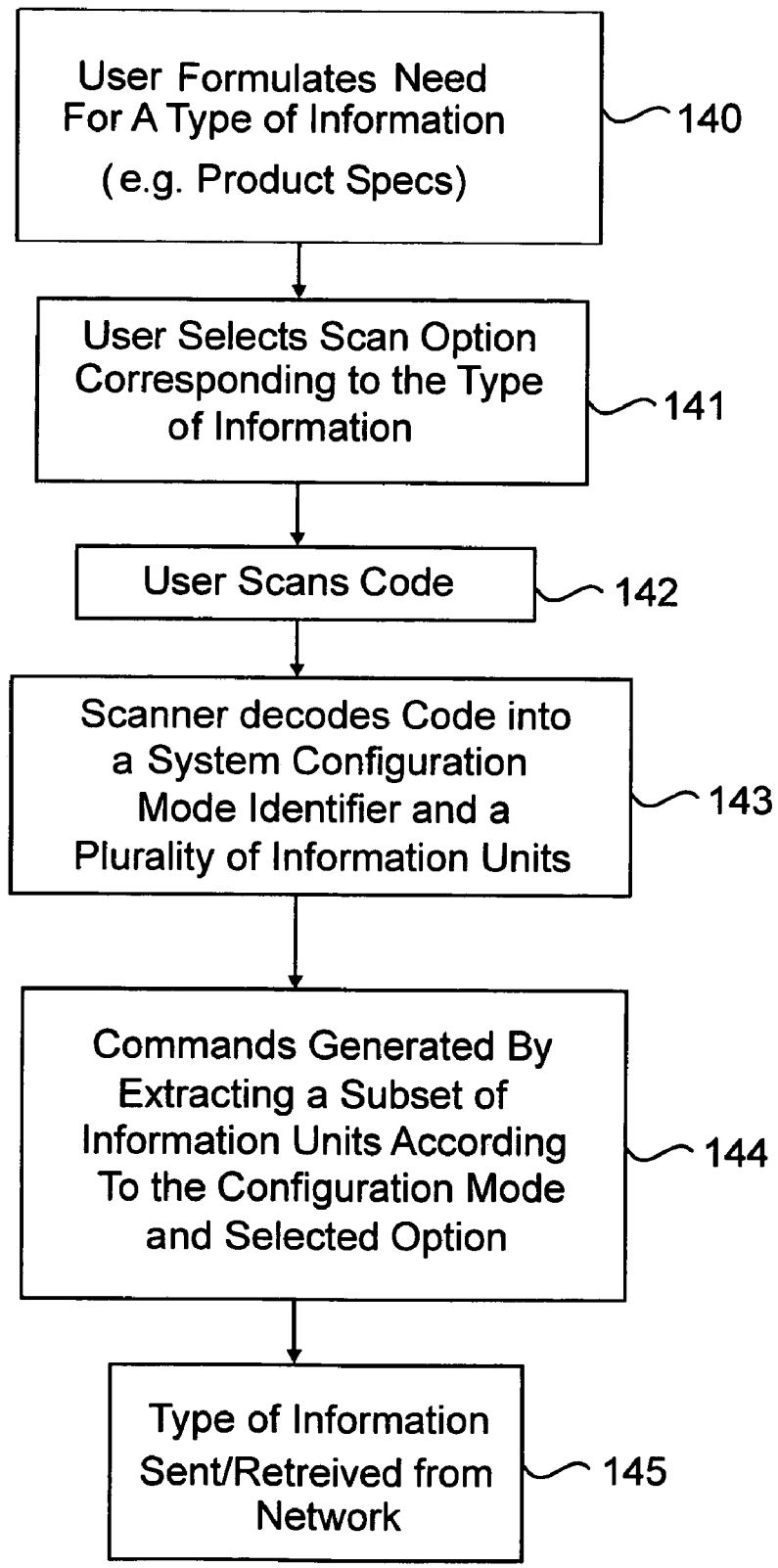
FIG. 14 is a diagrammatic flow chart to the preferred steps in the method of the invention.

The invention is further characterized as a method for accessing data on a wide area network. Referring now to FIG. 14, the key aspects of the method are that a user, while perusing a printed page, formulates 140 a need for further information of a particular type e.g. product specifications for a particular ad. Then, the user selects 141 one of a number of options associated with that type of information. In this case, there would be a particular option associated with product specification information. The user is informed of these available options by system convention, or more preferably, through direction given with the ad, e.g. a legend printed near the code. The user then scans 142 the code on the page using a scanner. The scanner decodes 143 the code into data stream that comprises a configuration mode identifier and a plurality of information units carried on the code. The mode identifier indicates the system configuration to the scanner driver running on a computer connectable to the network. The information units could, for example, include the absolute URL for the product manufacturer's home page on the internet. Another unit could be the magazine's homepage. Another unit could be the relative address of the product specs on the manufacturers website. The user's computer then extracts information units from the data stream according to the configuration mode and the selected option and generates 144 one or more commands to access/retrieve 145 the type of information from the network.

It is apparent to those skilled in the art that other configuration modes and user selectable options may be devised for other types of print media and their associated informational content. It is also well known that such modes and options are updatable via user selection or through automated download to the user's computer when an outdated driver is detected.

While the preferred embodiments of the invention have been described, modifications can be made and other embodiments may be devised without departing from the spirit of the invention and the scope of the appended claims.

What is claimed is:

1. A method for accessing data on a computer network said method comprising:
    capturing coded information with a code reader;
    providing coded information on a printed document, said coded information readable with a code reader;
    providing legend information on said printed document, said legend listing linking options for a user based on a respective orientation angle of said code reader to said coded information;
    positioning target locations for said code reader on said printed document, each said target location defining a respective said orientation angle for said code reader to said coded information;
    providing a user-activated input component to designate a chosen said orientation angle;
    calculating ascertaining a user chosen said orientation angle from a plurality of available said orientation angles made available to said user between said code reader and said code each of said orientation angles relating to a specific individual input parameter;
    employing said user-chosen orientation angle of said code reader to said code coded information to determine a user selected said input parameter from said plurality of available orientation angles; and
    generating a command from said user selected input parameter and a subset of said coded information relative to said user-chosen orientation angle.

2. The method of claim 1, wherein said coded information appears as a bar code on printed media which comprises a rotation guide associated with said code.

3. The method of claim 1, wherein said input parameter determined by said orientation angle of said code reader to said coded information comprises a destination URL and a printed page identification string.

4. The method of claim 3, which further comprises the step of automatically contacting the publisher of said printed media.

5. The method of claim 3, which further comprises the step of automatically contacting an advertiser associated with said printed media.

6. The method of claim 4, which further comprises the step of:
    linking to a website identified by said destination URL; and
    reporting said linking to said publisher.

7. The method of claim 6, wherein said method further comprises the step of:
    tracking whether said link linking results in enhanced exposure to said website.

8. The method of claim 7, which further comprises the step of: providing a dynamic reciprocal linked advertisement on said first website.

9. The method of claim 5, which further comprises the step of: providing a commission from said advertiser to said publisher.

* * * * *